(12) United States Patent
Bates et al.

(10) Patent No.: US 10,821,872 B2
(45) Date of Patent: Nov. 3, 2020

(54) PORTABLE MULTIPLE GRILL ASSEMBLY

(71) Applicants: Steven Bates, Ellenwood, PA (US);
Alisa Ware, Ellenwood, PA (US)

(72) Inventors: Steven Bates, Ellenwood, PA (US);
Alisa Ware, Ellenwood, PA (US)

(*) Notice: Subject to any disclaimer, the term of this patent is extended or adjusted under 35 U.S.C. 154(b) by 118 days.

(21) Appl. No.: 16/178,657

(22) Filed: Nov. 2, 2018

(65) Prior Publication Data
US 2020/0139872 A1    May 7, 2020

(51) Int. Cl.
| | |
|---|---|
| *B60P 3/025* | (2006.01) |
| *B62D 63/06* | (2006.01) |
| *B62D 63/08* | (2006.01) |
| *A47J 37/07* | (2006.01) |
| *B60N 3/00* | (2006.01) |
| *A47B 3/14* | (2006.01) |

(52) U.S. Cl.
CPC ............. *B60P 3/0257* (2013.01); *A47B 3/14* (2013.01); *A47J 37/0704* (2013.01); *A47J 37/0781* (2013.01); *B60N 3/001* (2013.01); *B62D 63/062* (2013.01); *B62D 63/08* (2013.01); *A47J 2037/0777* (2013.01)

(58) Field of Classification Search
CPC ..... B60P 3/0257; B60N 3/001; B62D 63/062; B62D 63/08; A47J 37/0704; A47J 37/0781; A47J 2037/0777; A47B 3/14; F24C 1/16; F24B 1/207; A47C 9/022; A47C 9/007; A47C 9/10; A47C 9/105; A47C 4/52
See application file for complete search history.

(56) References Cited

U.S. PATENT DOCUMENTS

| | | | | |
|---|---|---|---|---|
| 363,226 A | * | 5/1887 | Gowell | A47C 9/022 297/141 |
| 371,168 A | * | 10/1887 | Boss | A47C 9/022 297/143 |
| 784,604 A | * | 3/1905 | Wall | A47B 83/02 297/143 |
| 850,453 A | * | 4/1907 | Winans | A47C 9/007 248/371 |
| 1,265,999 A | * | 5/1918 | Cusanelli | A47C 9/022 297/142 |
| 2,824,598 A | * | 2/1958 | Ertl | A47C 9/022 297/143 |
| 3,741,606 A | * | 6/1973 | Grier | B60P 3/36 296/22 |
| 3,940,175 A | | 2/1976 | Robison | |

(Continued)

FOREIGN PATENT DOCUMENTS

KR    101900223 B1 *  9/2018

*Primary Examiner* — Jorge A Pereiro (57) ABSTRACT

A portable multiple grill assembly includes a trailer that is towed behind a vehicle. A fire pit is coupled to the trailer for containing an open flame. A plurality of cooking grills is each coupled to the trailer. A table is coupled to and extends outwardly from the plurality of cooking grills. A plurality of chair units is each slidably coupled to the trailer. Each of the chair units is slidable into a deployed position to have a user sit thereon. A venting unit is coupled to the trailer to vent smoke from cooking grills thereby inhibiting the user from being exposed to the smoke. A display is coupled to the trailer and the display is elevated above the fire pit and the cooking grills to be visible to the user when the user is seated on the one of the chair units.

12 Claims, 9 Drawing Sheets

(56) References Cited

U.S. PATENT DOCUMENTS

| | | | | |
|---|---|---|---|---|
| 3,991,739 A * | 11/1976 | Hoffman, Jr. | | F24C 3/14 |
| | | | | 126/268 |
| 4,601,509 A | 7/1986 | Ellis, Sr. | | |
| 4,877,011 A * | 10/1989 | Willice | | A47J 37/0704 |
| | | | | 126/25 R |
| 5,673,968 A * | 10/1997 | Ponzio | | A47C 9/022 |
| | | | | 297/143 |
| 6,314,891 B1 | 11/2001 | Larson | | |
| 6,416,101 B1 * | 7/2002 | Bartch | | B60P 3/0257 |
| | | | | 296/168 |
| 6,557,547 B1 * | 5/2003 | MacIntosh | | A47J 37/0713 |
| | | | | 126/268 |
| D479,406 S * | 9/2003 | Pajerski | | D6/337 |
| D479,773 S * | 9/2003 | Pajerski | | D6/337 |
| 6,641,213 B1 * | 11/2003 | Kuhn | | A47B 83/04 |
| | | | | 108/48 |
| 6,722,266 B1 * | 4/2004 | Yang | | A47J 37/0781 |
| | | | | 126/25 R |
| 6,725,855 B1 * | 4/2004 | Brennan | | A47J 37/0763 |
| | | | | 126/276 |
| 7,052,062 B2 * | 5/2006 | Catt | | A47F 9/00 |
| | | | | 222/610 |
| 8,820,313 B1 | 9/2014 | Lutes | | |
| 2002/0043259 A1 * | 4/2002 | Brennan | | B66F 7/0625 |
| | | | | 126/41 R |
| 2005/0109331 A1 * | 5/2005 | Chao | | A47J 37/0781 |
| | | | | 126/25 R |
| 2007/0046078 A1 * | 3/2007 | Humfeldt | | A47B 83/00 |
| | | | | 297/142 |
| 2008/0314946 A1 * | 12/2008 | Owenby | | B60R 9/06 |
| | | | | 224/487 |
| 2010/0096893 A1 * | 4/2010 | Walker | | A47C 9/022 |
| | | | | 297/217.1 |
| 2010/0176170 A1 | 7/2010 | O'Hare | | |
| 2011/0162634 A1 * | 7/2011 | Richard | | A47J 37/0781 |
| | | | | 126/25 R |
| 2014/0116415 A1 * | 5/2014 | Birke | | A47J 37/0781 |
| | | | | 126/37 A |
| 2014/0174427 A1 * | 6/2014 | Yuen | | A47J 37/067 |
| | | | | 126/25 R |
| 2014/0261383 A1 * | 9/2014 | Dudenhoeffer | | A47J 37/0781 |
| | | | | 126/277 |
| 2016/0368427 A1 * | 12/2016 | Field, Jr. | | B60R 9/06 |
| 2018/0252414 A1 * | 9/2018 | Greiwe | | F24B 1/189 |
| 2018/0310764 A1 * | 11/2018 | Rheaume | | F24C 3/14 |
| 2019/0051090 A1 * | 2/2019 | Goldberg | | B60P 3/0257 |
| 2019/0159630 A1 * | 5/2019 | Salum | | A47J 37/0781 |

\* cited by examiner

PORTABLE MULTIPLE GRILL ASSEMBLY

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to multiple grill devices and more particularly pertains to a new multiple grill device for facilitating portable grilling for multiple individuals.

BRIEF SUMMARY OF THE INVENTION

An embodiment of the disclosure meets the needs presented above by generally comprising a trailer that is towed behind a vehicle. A fire pit is coupled to the trailer for containing an open flame. A plurality of cooking grills is each coupled to the trailer. A table is coupled to and extends outwardly from the plurality of cooking grills. A plurality of chair units is each slidably coupled to the trailer. Each of the chair units is slidable into a deployed position to have a user sit thereon. A venting unit is coupled to the trailer to vent smoke from cooking grills thereby inhibiting the user from being exposed to the smoke. A display is coupled to the trailer and the display is elevated above the fire pit and the cooking grills to be visible to the user when the user is seated on the one of the chair units.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
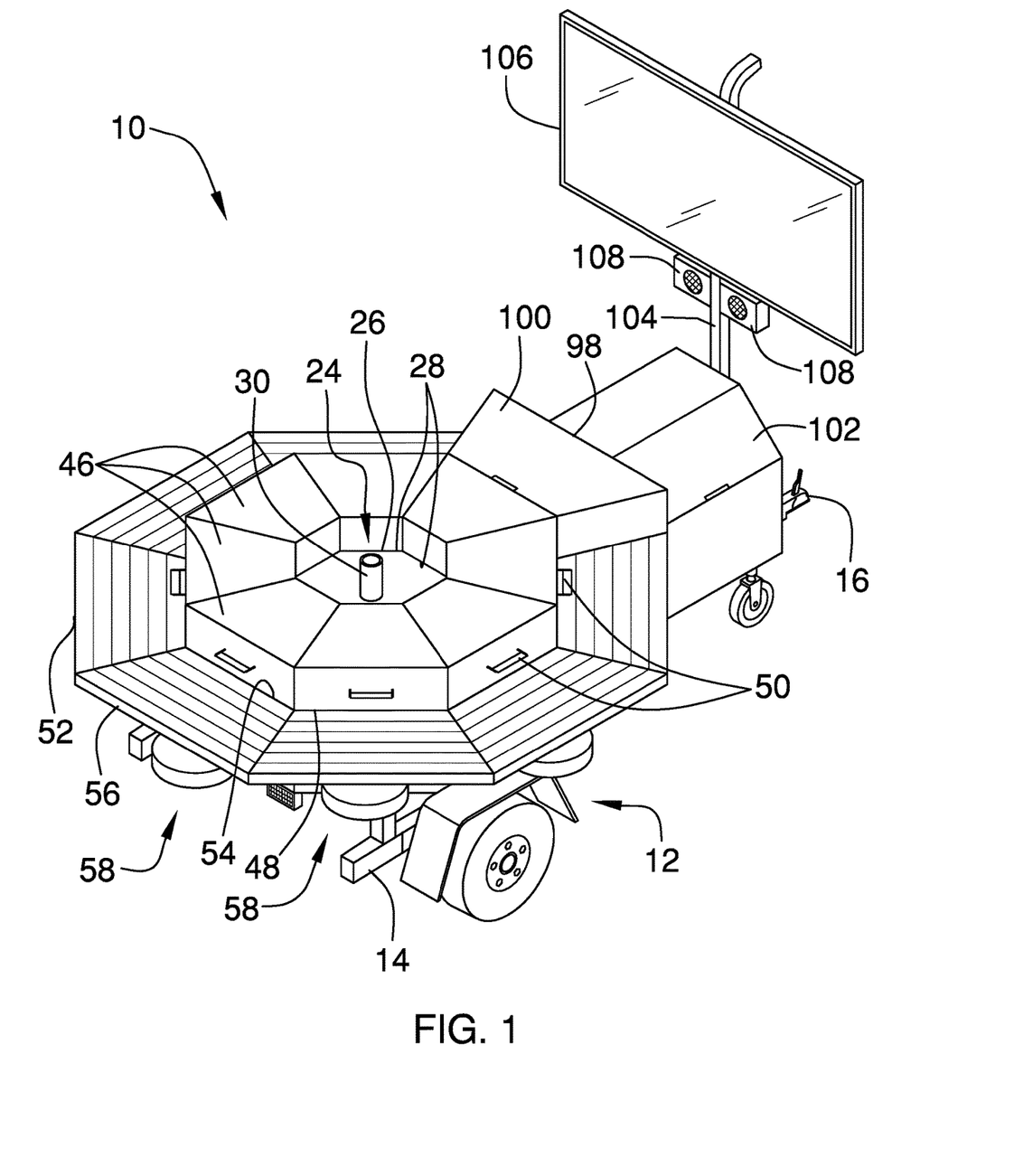
FIG. 1 is a top perspective view of a portable multiple grill assembly according to an embodiment of the disclosure.
Figure 2:
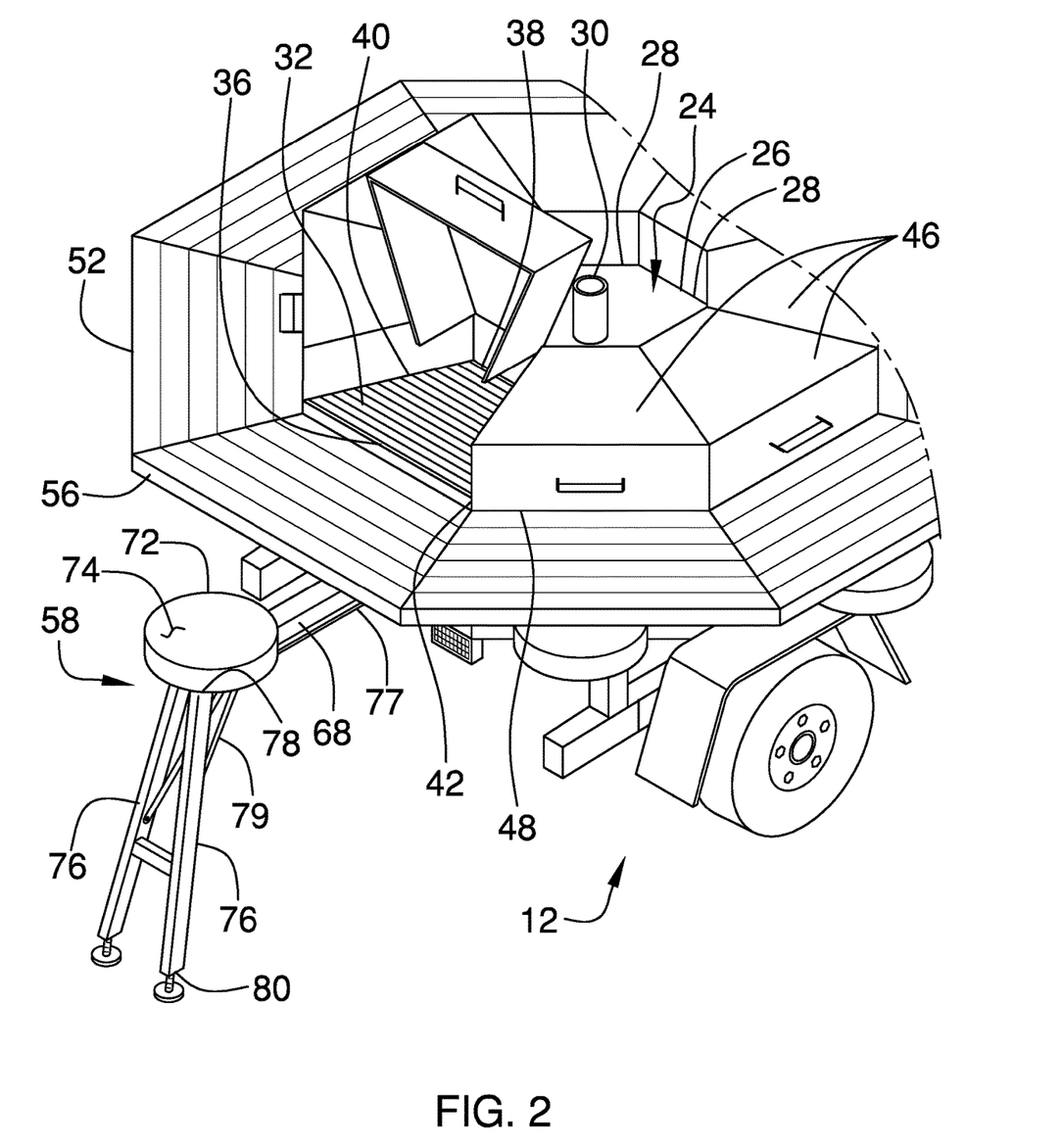
FIG. 2 is a rear perspective view of an embodiment of the disclosure showing a chair unit in a deployed position.
Figure 3:
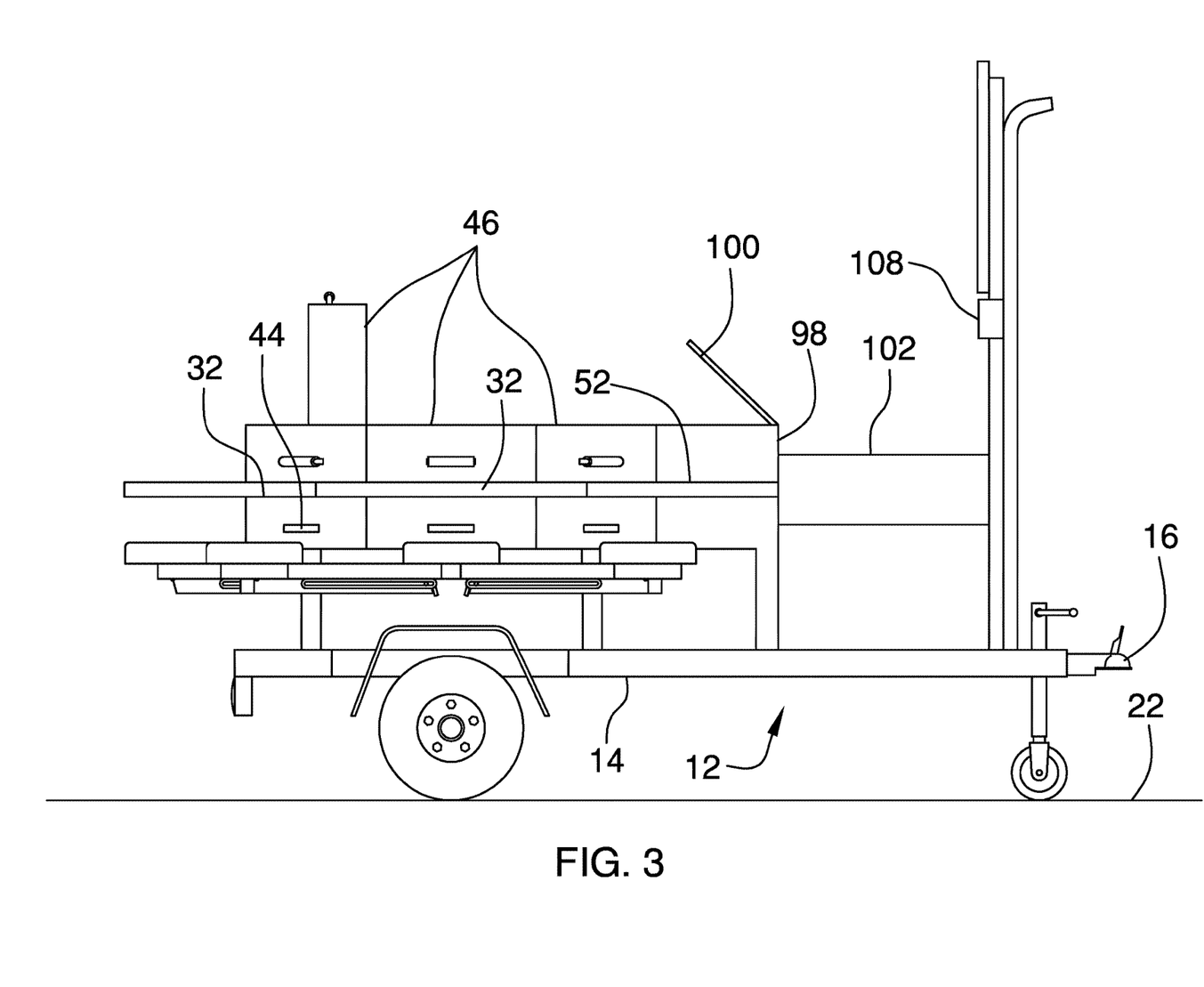
FIG. 3 is a right side view of an embodiment of the disclosure.
Figure 4:
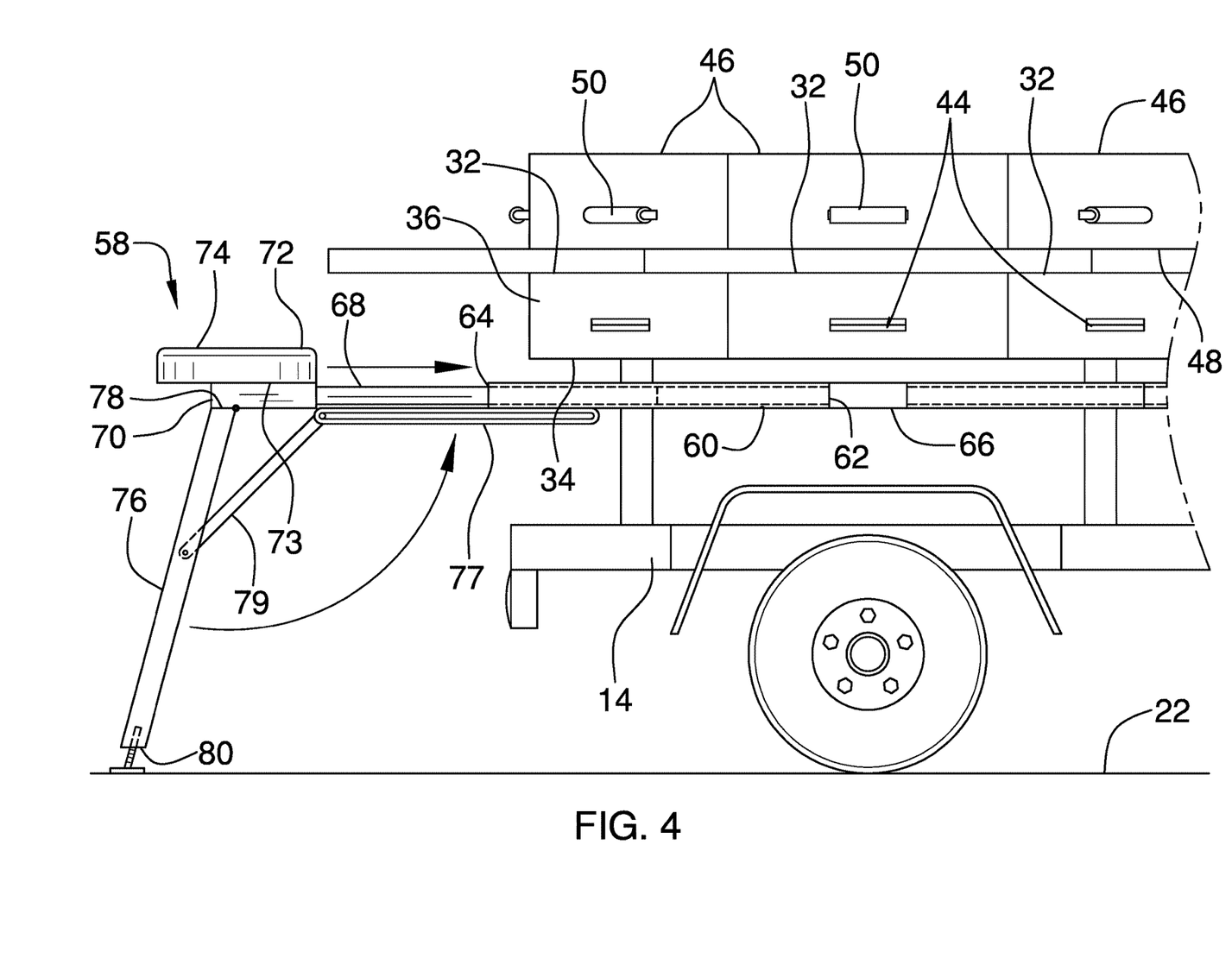
FIG. 4 is a right side phantom view of an embodiment of the disclosure showing a chair unit being urged into a stored position.
Figure 5:
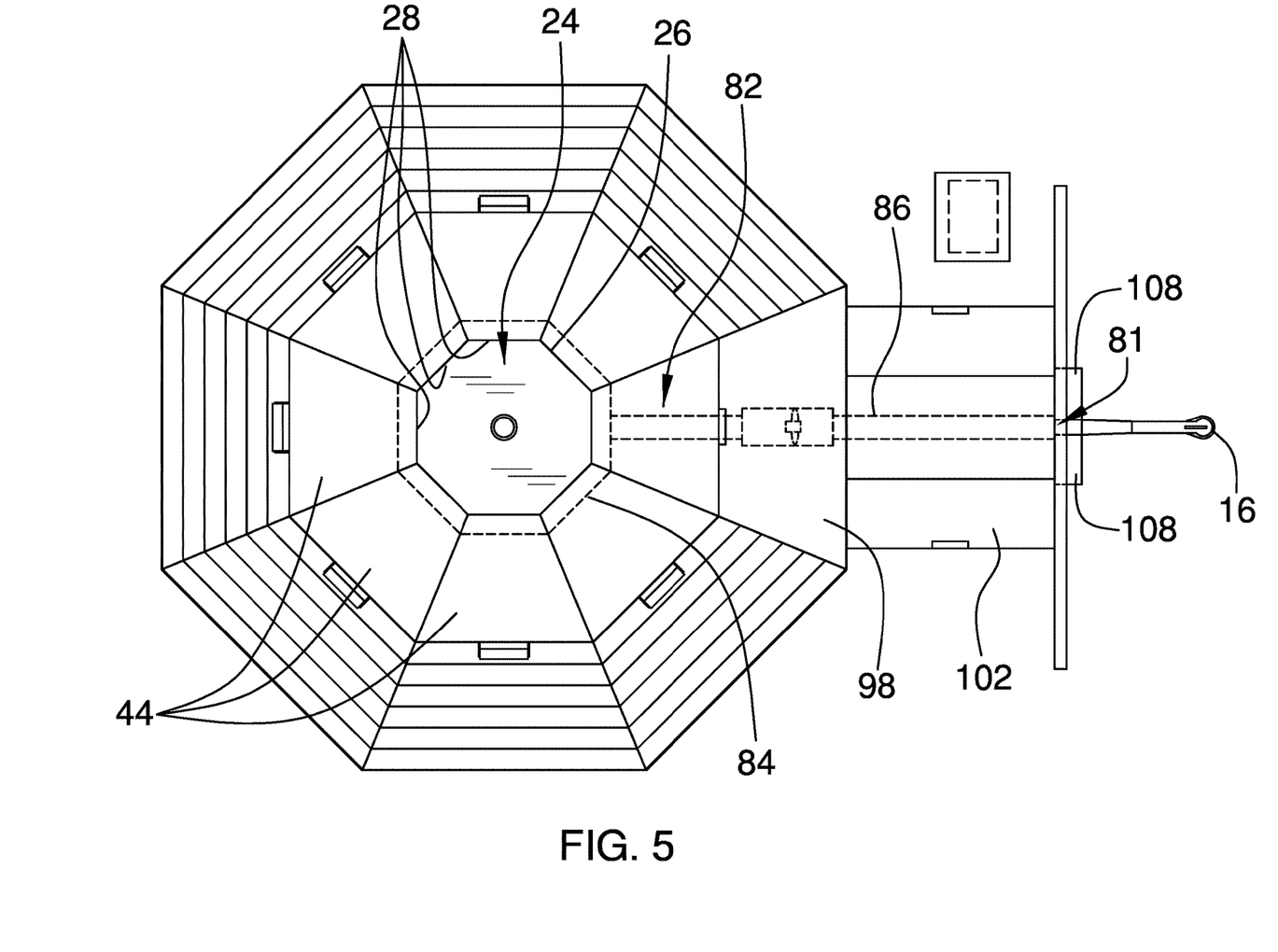
FIG. 5 is a top phantom view of an embodiment of the disclosure.
Figure 6:
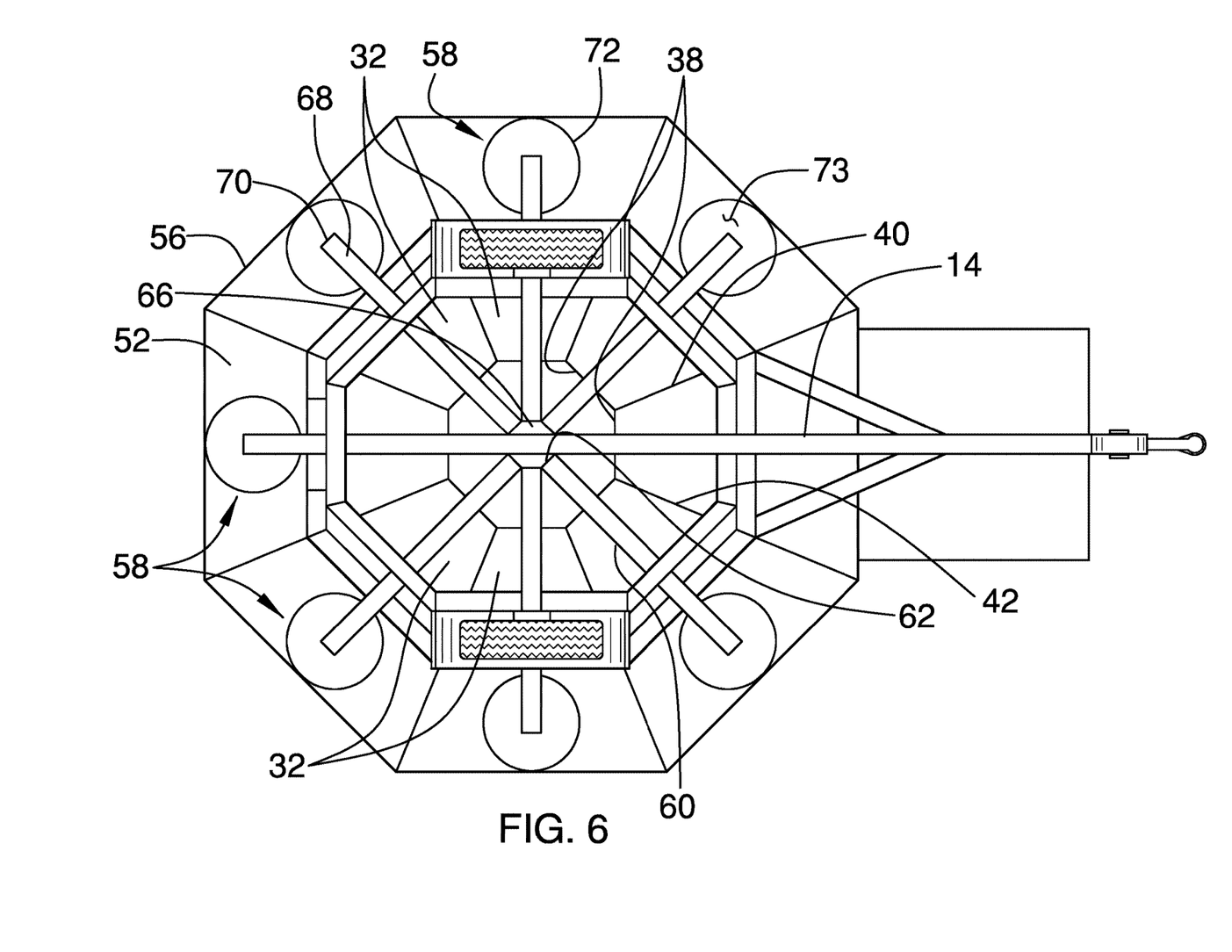
FIG. 6 is a bottom view of an embodiment of the disclosure.
Figure 7:
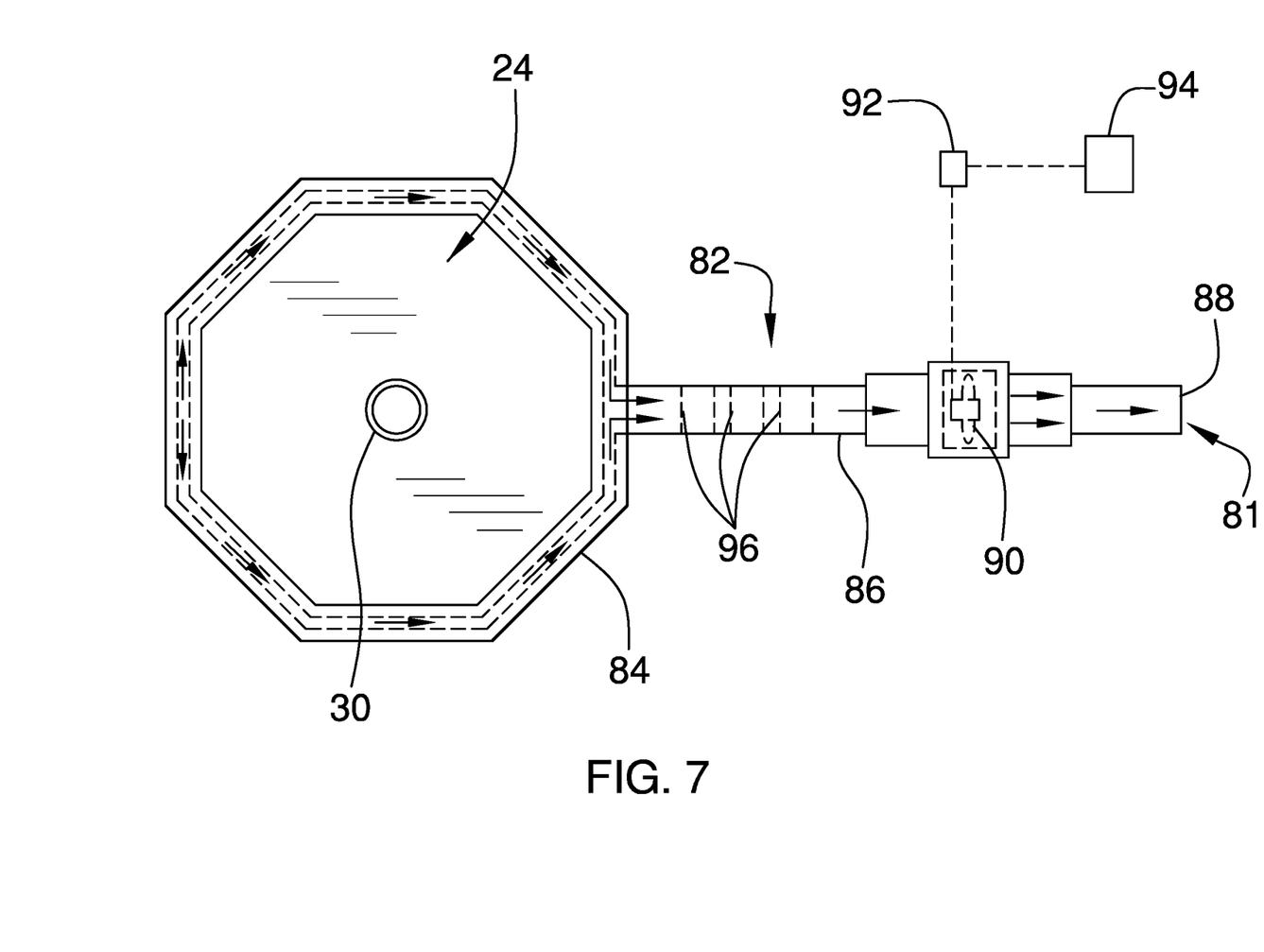
FIG. 7 is a top view of a venting unit of an embodiment of the disclosure.
Figure 8:
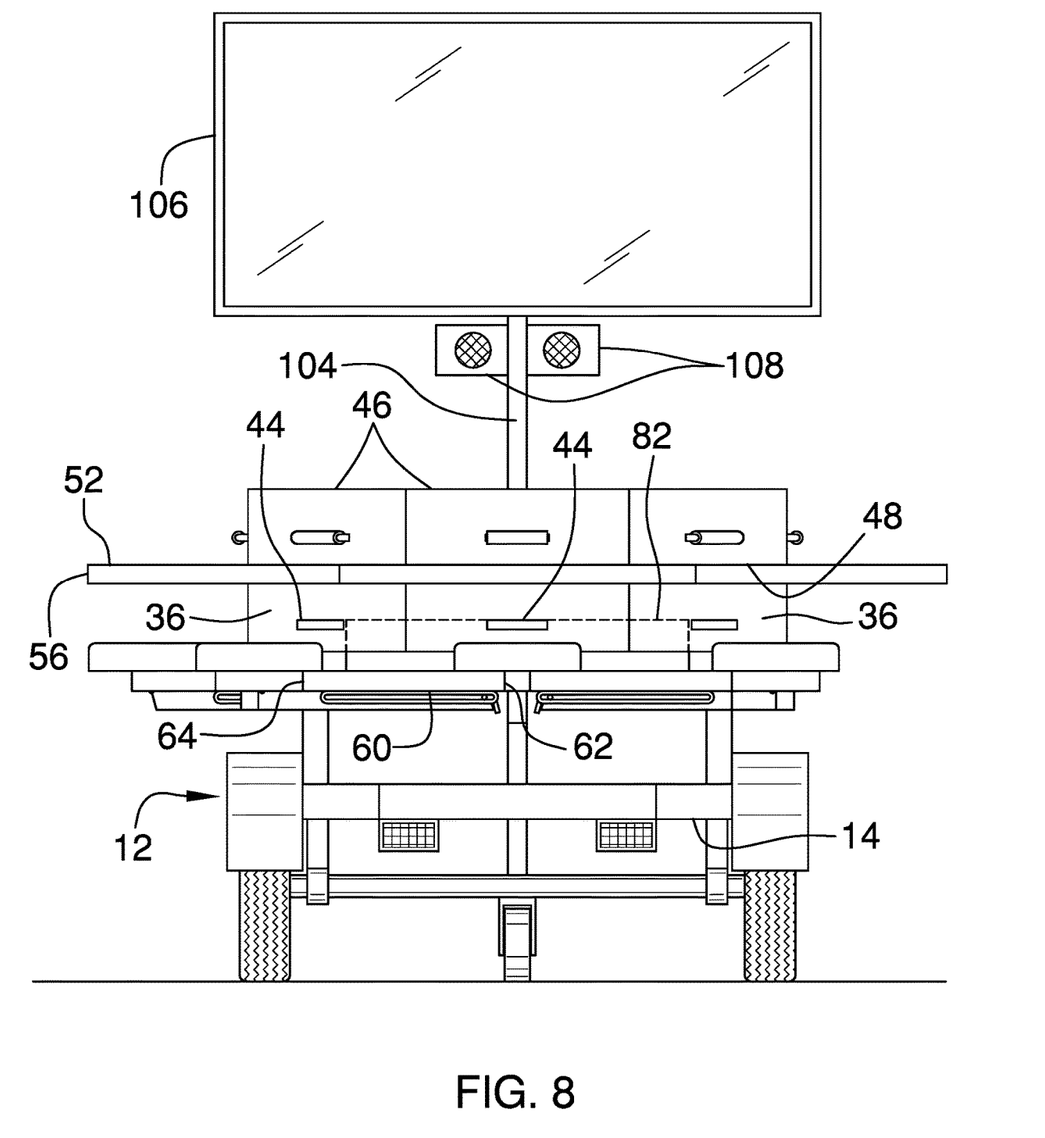
FIG. 8 is a back view of an embodiment of the disclosure.
Figure 9:
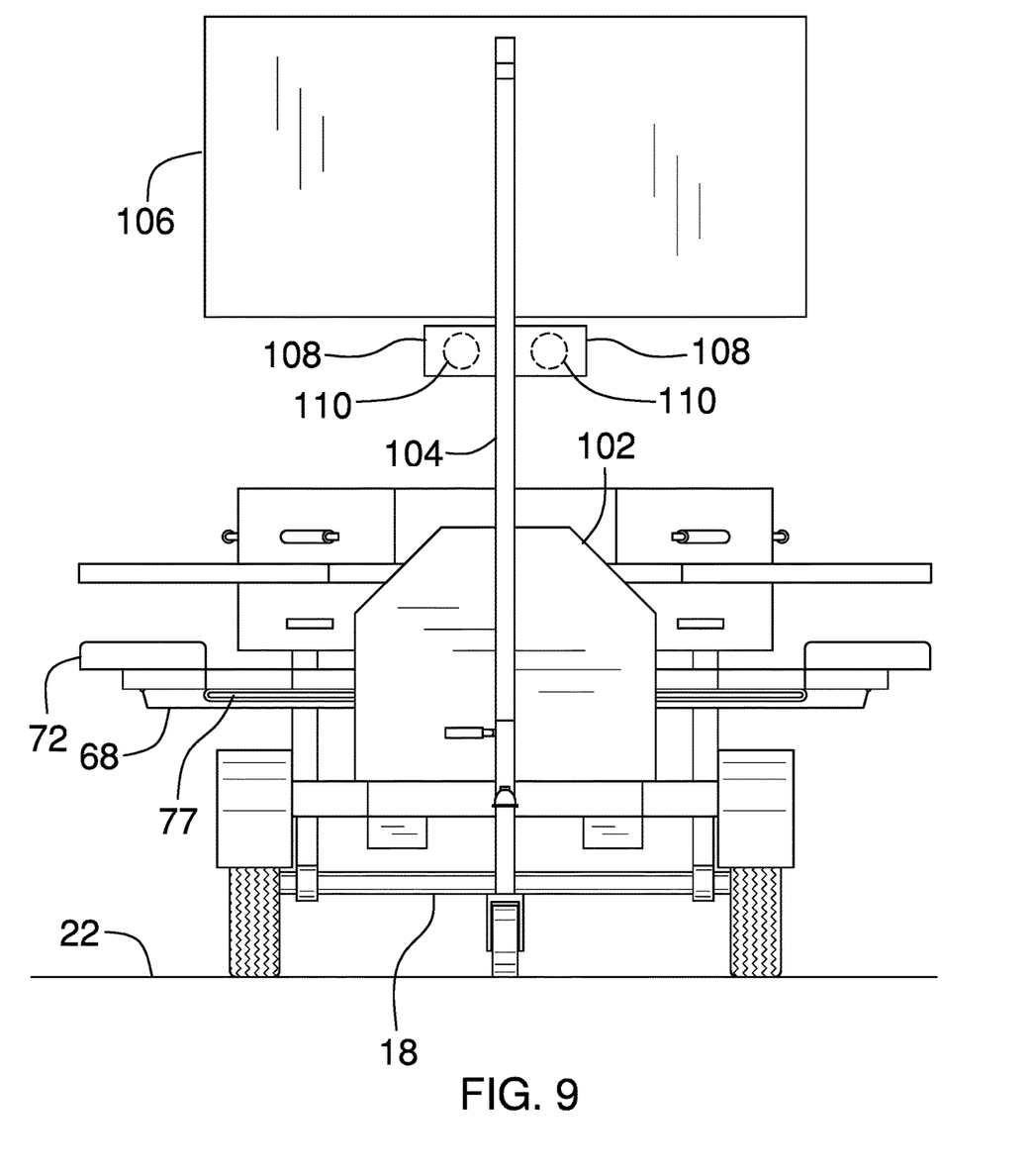
FIG. 9 is a front view of an embodiment of the disclosure.

With reference now to the drawings, and in particular to FIGS. 1 through 9 thereof, a new multiple grill device embodying the principles and concepts of an embodiment of the disclosure and generally designated by the reference numeral 10 will be described.

As best illustrated in FIGS. 1 through 9, the portable multiple grill assembly 10 generally comprises a trailer 12 that can be towed behind a vehicle. The trailer 12 has a frame 14, a hitch 16 and an axle 18, and the axle 18 has a pair of wheels 20 being rotatably coupled thereto for rolling along a support surface 22. A fire pit 24 is coupled to and is positioned above the frame 14 of the trailer 12. The fire pit 24 is comprised of a fire resistant material for containing an open flame. The fire pit 24 has a perimeter edge 26 and the perimeter edge 26 has a plurality of intersecting sides 28 such that the fire pit 24 has an octagonal shape. Moreover, the fire pit 24 is centrally positioned on the trailer 12. A tube 30 is coupled to and extends upwardly from the fire pit 24 for insertably receiving an umbrella pole, and the tube 30 is centrally positioned in the fire pit 24.

A plurality of cooking grills 32 is provided and each of the cooking grills 32 is coupled to and is positioned above the frame 14 of the trailer 12. The plurality of cooking grills 32 is distributed around the fire pit 24. Each of the cooking grills 32 has a bottom side 34, a front side 36, a back side 38, a first lateral side 40 and a second lateral side 42. Each of the first 40 and second 42 lateral sides of each of the cooking grills 32 tapers inwardly between the front 36 and back 38 sides of the cooking grills 32 such that each of the cooking grills 32 has a trapezoidal shape.

The back side 38 of each of the cooking grills 32 abuts a respective one of the intersecting sides 28 of the perimeter edge 26 of the fire pit 24. The cooking grills 32 are distributed around the fire pit 24 such that the front side 36 of each of the cooking grills 32 defines an octagonal shape. Additionally, the front side 36 of each of the cooking grills 32 has an air opening extending 44 therethrough for passing air into the cooking grills 32 for enhancing and modulating combustion. Each of the cooking grills 32 may be a charcoal cooking grill or the like.

A plurality of lids 46 is each hingedly coupled to a respective one of the cooking grills 32. Each of the lids 46 has a bottom edge 48 and the bottom edge 48 is coextensive with the front 36, back 38, first lateral 40 and second 42 lateral sides of the respective cooking grill 32. Each of the lids 46 is positionable between an open position and a closed position. A plurality of handles 50 is each coupled to a respective one of the lids 46 for gripping and thusly manipulating the respective lid 46. Additionally, each of the handles 50 is aligned with the front side 36 of the cooking grill 32 upon which the respective lid 46 is positioned.

A table 52 is coupled to and extends outwardly from the plurality of cooking grills 32. The table 52 has a rear edge 54 and a forward edge 56. The rear edge 54 is coupled to the front side 36 of each of the cooking grills 32 such that the table 52 extends fully around the octagonal shape defined by the front side 36 of the each of the cooking grills 32. The table 52 is aligned with an intersection between the cooking grills 32 and the lids having the table 52 lying on a plane that is horizontally oriented.

A plurality of chair units 58 is provided and each of the chair units 58 is slidably coupled to the trailer 12. Each of the chair units 58 is slidable into a deployed position having the chair units 58 extending outwardly beyond the table 52 for having a user sit thereon. Each of the chair units 58 is slidable into a stored position having each of the chair units 58 being positioned beneath the table 52. Each of the chair units 58 comprises a sleeve 60 that has a first end 62 and a second end 64. The sleeve 60 is coupled to the trailer 12 having the sleeve 60 being positioned between the table 52 and the frame 14 of the trailer 12.

The first end 62 of the sleeve 60 of each of the chair units 58 is coupled to a hub 66 that is centrally positioned beneath the fire pit 24. Additionally, the sleeve 60 of each of the chair units 58 radiates outwardly from the hub 66. The second end 64 of the sleeve 60 is aligned with the forward edge 56 of the table 52. A member 68 is slidably positioned in the sleeve 60 and the member 68 has a distal end 70 with respect to the second end 64 of the sleeve 60. The distal end 70 is spaced outwardly from the forward edge 56 of the table 52 when the member 68 is urged into a deployed position from the sleeve 60. Moreover, the distal end 70 of the member 68 is aligned with the forward edge 56 of the table 52 when the member 68 is positioned in a stored position in the sleeve 60.

Each of the chair units 58 includes a stool 72 that has a bottom surface 73 and a top surface 74. The bottom surface 73 is coupled to the member 68 having the top surface 74 lying on a plane that is horizontally oriented and having the stool 72 being aligned with the distal end 70 of the member 68. In this way a user can be seated on the stool 72 when the member 68 is positioned in the deployed position. Each of the chair units 58 includes a pair of legs 76 that each has an upper end 78 and a lower end 80.

The upper end 78 of each of the legs 76 is pivotally coupled to the bottom surface 73 of the stool 72. Each of the legs 76 is positionable in a stored position having the legs 76 extending toward the hub 66 to which the sleeve 60 is attached. Moreover, each of the legs 76 is positionable in a deployed position having each of the legs 76 extending downwardly from the stool 72 to abut the support surface 22 for supporting weight of the user. Each of the legs 76 may include a track 77 that is coupled to the sleeve 60 and a support 79 that slidably engages the track 77. The support 79 may be positioned at an angle between the track 77 and the legs 76 for inhibiting the member 68 from being inadvertently urged into the stored position.

A venting unit 82 is coupled to the trailer 12 and the venting unit 82 is in fluid communication with each of the cooking grills 32. The venting unit 82 draws smoke from combustion in the cooking grills 32 inwardly into the venting unit 82. Additionally, the venting unit 82 urges the smoke from the cooking grills 32 outwardly through an exhaust 81 to inhibit the user from being exposed to the smoke. The venting unit 82 comprises a duct 84 that is coupled to the bottom side 34 of each of the cooking grills 32. The duct 84 is in fluid communication with an interior of each of the cooking grills 32 for receiving the smoke from the cooking grills 32 and the duct 84 extends around the perimeter edge 26 of the fire pit 24.

A conduit 86 is coupled to the duct 84 and extends toward the hitch 16 on the trailer 12. The conduit 86 is in fluid communication with the duct 84 for receiving the smoke from the duct 84. Additionally, the conduit 86 has a distal end 88 with respect to the duct 84 defining the exhaust 81 of the venting unit 82. A fan 90 is positioned within the conduit 86 to urge air outwardly through the exhaust when the fan 90 is turned on thereby facilitating the smoke to be urged outwardly through the exhaust 81. The fan 90 may be an electrical fan that includes a motor and a plurality of blades.

A switch 92 is coupled to the trailer 12 and the switch 92 is electrically coupled to the fan 90 for turning the fan 90 on and off. The switch 92 is electrically coupled to a power source 94. The power source 94 may comprise a battery positioned on the trailer 12 or an electrical system of the vehicle that is towing the trailer 12. A plurality of smoke filters 96 is each positioned within the conduit 86. Each of the smoke filters 96 is comprised of an air permeable material to filter particles from the smoke.

A storage box 98 is coupled to the trailer 12 for storing objects and the storage box 98 is positioned on top of the table 52. The storage box 98 includes a lid 100 that is hingedly coupled thereto for opening and closing the storage box 98. A cooler 102 is coupled to the trailer 12 for storing food items. The cooler 102 is comprised of a thermally insulating material to inhibit thermal communication between ambient air and the food items. Additionally, the cooler 102 is positioned between the storage box 98 and the hitch 16.

A stanchion 104 is coupled to and extends upwardly from the trailer 12 and the stanchion 104 is positioned between the cooler 102 and the hitch 16. A display 106 is coupled to the stanchion 104 such that the display 106 is elevated above the fire pit 24 and the cooking grills 32. In this way the display 106 is visible to the user when the user is seated on the one of the chair units 58. The display 106 is electrically coupled to the power source 94 and the display 106 may comprise a flat screen television or the like. The stanchion 104 may be hollow and the stanchion 104 may be in fluid communication with the exhaust 81 of the venting unit 82. Thus, the stanchion 104 may direct the smoke outwardly therefrom thereby reducing the likelihood that the users will be exposed to the smoke. A pair of speakers 108 is each coupled to the stanchion 104 and each of the speakers 108 is electrically coupled to the power source 94. Each of the speakers 108 includes a transceiver 110, such as a Bluetooth transceiver or the like, thereby facilitating the speakers 108 to receive an audio signal from a remote source.

In use, the trailer 12 is towed to a selected destination such as a tailgate party, an outdoor barbeque or other celebratory event involving grilling food. Each of the cooking grills 32 is selectively employed for grilling and each of the chair units 58 is selectively deployed to provide seating for users. Additionally, the table 52 facilitates the users to eat while seated on the chair units 58. The venting unit 82 is turned on when the cooking grills 32 are employed for grilling. In this way the smoke resulting from grilling in the cooking grills 32 is drawn from the cooking grills 32 and is urged outwardly through the exhaust 31. In this way the users are inhibited from being exposed to the smoke thereby enhancing comfort for the users. Additionally, the fire pit 24 can be employed for containing an open flame and an umbrella pole can be inserted into the tube 30 for positioning an umbrella over the fire pit 24, cooking grills 32 and table 52.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable multiple grill assembly being configured to be towed behind a vehicle for serving food to a plurality of people, said assembly comprising:
   a trailer being towed behind a vehicle, said trailer having a frame, a hitch and an axle, said axle having a pair of wheels being rotatably coupled thereto for rolling along a support surface;
   a fire pit being coupled to and being positioned above said frame of said trailer, said fire pit being comprised of a fire resistant material wherein said fire pit is configured to contain an open flame, said fire pit having a perimeter edge, said perimeter edge having a plurality of intersecting sides such that said fire pit has an octagonal shape, said fire pit being centrally positioned on said trailer;
   a plurality of cooking grills, each of said cooking grills being coupled to and being positioned above said frame of said trailer, said plurality of cooking grills being distributed around said fire pit, each of said cooking grills having a bottom side, a front side, a back side, a first lateral side and a second lateral side, each of said first and second lateral sides of each of said cooking grills tapering inwardly between said front and back sides of said cooking grills such that each of said cooking grills has a trapezoidal shape, said back side of each of said cooking grills abutting a respective one of said intersecting sides of said perimeter edge of said fire pit having said cooking grills being distributed around said fire pit such that said front side of each of said cooking grills defines an octagonal shape, said front side of each of said cooking grills has an air opening extending therethrough for passing air therethrough;
   a table being coupled to and extending outwardly from said plurality of cooking grills;
   a plurality of chair units, each of said chair units being slidably coupled to said trailer, each of said chair units being slidable into a deployed position having said chair units extending outwardly beyond said table wherein each of said chair units is configured to have a user sit thereon, each of said chair units being slidable into a stored position having each of said chair units being positioned beneath said table;
   a venting unit being coupled to said trailer, said venting unit being in fluid communication with each of said cooking grills thereby facilitating said venting unit to draw smoke from combustion in said cooking grills inwardly into said venting unit, said venting unit urging the smoke from said cooking grills outwardly through an exhaust wherein said venting unit is configured to inhibit the user from being exposed to the smoke, said venting unit comprising a duct being coupled to said bottom side of each of said cooking grills, said duct being in fluid communication with an interior of each of said cooking grills for receiving the smoke from said cooking grills, said duct extending around said perimeter edge of said fire pit; and
   a display being coupled to said trailer such that said display is elevated above said fire pit and said cooking grills wherein said display is configured to be visible to the user when the user is seated on said one of said chair units.

2. The assembly according to claim 1, further comprising:
   a plurality of lids, each of said lids being hingedly coupled to a respective one of said cooking grills, each of said lids having a bottom edge, said bottom edge being coextensive with said front, back, first lateral and second lateral sides of said respective cooking grill, each of said lids being positionable between an open position and a closed position; and
   a plurality of handles, each of said handles being coupled to a respective one of said lids for gripping and thusly manipulating said respective lid, each of said handles being aligned with said front side of said cooking grill upon which said respective lid is positioned.

3. The assembly according to claim 2, wherein said table has a rear edge and a forward edge, said rear edge being coupled to said front side of each of said cooking grills such that said table extends fully around said octagonal shape defined by said plurality of cooking grills, said table being aligned with an intersection between said cooking grills and said lids having said table lying on a plane being horizontally oriented.

4. The assembly according to claim 1, wherein said venting unit comprises a conduit being coupled to said duct and extending toward said hitch on said trailer, said conduit being in fluid communication with said duct for receiving the smoke from said duct, said conduit having a distal end with respect to said duct defining said exhaust of said venting unit.

5. The assembly according to claim 4, wherein said venting unit comprises a fan being positioned within said conduit wherein said fan is configured to urge air outwardly through said exhaust when said fan is turned on thereby facilitating the smoke to be urged outwardly through said exhaust.

6. The assembly according to claim 5, wherein said venting unit comprises a switch being coupled to said trailer, said switch being electrically coupled to said fan for turning said fan on and off, said switch being electrically coupled to a power source.

7. The assembly according to claim 6, wherein said venting unit comprises a plurality of smoke filters, each of said smoke filters being positioned within said conduit, each of said smoke filters being comprised of an air permeable material wherein each of said smoke filters is configured to filter particles from the smoke.

8. A portable multiple grill assembly being configured to be towed behind a vehicle for serving food to a plurality of people, said assembly comprising:

a trailer being towed behind a vehicle, said trailer having a frame, a hitch and an axle, said axle having a pair of wheels being rotatably coupled thereto for rolling along a support surface;

a fire pit being coupled to and being positioned above said frame of said trailer, said fire pit being comprised of a fire resistant material wherein said fire pit is configured to contain an open flame, said fire pit having a perimeter edge, said perimeter edge having a plurality of intersecting sides such that said fire pit has an octagonal shape, said fire pit being centrally positioned on said trailer;

a plurality of cooking grills, each of said cooking grills being coupled to and being positioned above said frame of said trailer, said plurality of cooking grills being distributed around said fire pit, each of said cooking grills having a bottom side, a front side, a back side, a first lateral side and a second lateral side, each of said first and second lateral sides of each of said cooking grills tapering inwardly between said front and back sides of said cooking grills such that each of said cooking grills has a trapezoidal shape, said back side of each of said cooking grills abutting a respective one of said intersecting sides of said perimeter edge of said fire pit having said cooking grills being distributed around said fire pit such that said front side of each of said cooking grills defines an octagonal shape, said front side of each of said cooking grills has an air opening extending therethrough for passing air therethrough;

a table being coupled to and extending outwardly from said plurality of cooking grills, said table having a rear edge and a forward edge, said rear edge being coupled to said front side of each of said cooking grills such that said table extends fully around said octagonal shape defined by said plurality of cooking grills, said table being aligned with an intersection between said cooking grills and said lids having said table lying on a plane being horizontally oriented;

a plurality of chair units, each of said chair units being slidably coupled to said trailer, each of said chair units being slidable into a deployed position having said chair units extending outwardly beyond said table wherein each of said chair units is configured to have a user sit thereon, each of said chair units being slidable into a stored position having each of said chair units being positioned beneath said table;

a venting unit being coupled to said trailer, said venting unit being in fluid communication with each of said cooking grills thereby facilitating said venting unit to draw smoke from combustion in said cooking grills inwardly into said venting unit, said venting unit urging the smoke from said cooking grills outwardly through an exhaust wherein said venting unit is configured to inhibit the user from being exposed to the smoke;

a display being coupled to said trailer such that said display is elevated above said fire pit and said cooking grills wherein said display is configured to be visible to the user when the user is seated on said one of said chair units;

a plurality of lids, each of said lids being hingedly coupled to a respective one of said cooking grills, each of said lids having a bottom edge, said bottom edge being coextensive with said front, back, first lateral and second lateral sides of said respective cooking grill, each of said lids being positionable between an open position and a closed position;

a plurality of handles, each of said handles being coupled to a respective one of said lids for gripping and thusly manipulating said respective lid, each of said handles being aligned with said front side of said cooking grill upon which said respective lid is positioned; and each of said chair units comprising a sleeve having a first end and a second end, said sleeve being coupled to said trailer having said sleeve being positioned between said table and said frame of said trailer, said first end of said sleeve of each of said chair units being coupled to a hub being centrally positioned beneath said fire pit having said sleeve of each of said chair units radiating outwardly from said hub, said second end of said sleeve being aligned with said forward edge of said table.

9. The assembly according to claim 8, wherein each of said chair unit comprises a member being slidably positioned in said sleeve, said member having a distal end with respect to said second end of said sleeve, said distal end being spaced outwardly from said forward edge of said table when said member is urged into a deployed position from said sleeve, said distal end of said member being aligned with said forward edge of said table when said member is positioned in a stored position in said sleeve.

10. The assembly according to claim 9, wherein each of said chair units comprises a stool having a bottom surface and a top surface, said bottom surface being coupled to said member having said top surface lying on a plane being horizontally oriented and having said stool being aligned with said distal end of said member wherein said stool is configured to have a user seated thereon when said member is positioned in said deployed position.

11. The assembly according to claim 10, wherein each of said chair units comprises a pair of legs, each of said legs having an upper end and a lower end, said upper end of each of said legs being pivotally coupled to said bottom surface of said stool, each of said legs being positionable in a stored position having said legs extending toward said hub to which said sleeve is attached, each of said legs being positionable in a deployed position having each of said legs extending downwardly from said stool wherein said lower end of said legs is configured to abut the support surface for support weight of the user.

12. A portable multiple grill assembly being configured to be towed behind a vehicle for serving food to a plurality of people, said assembly comprising:

a trailer being towed behind a vehicle, said trailer having a frame, a hitch and an axle, said axle having a pair of wheels being rotatably coupled thereto for rolling along a support surface;

a fire pit being coupled to and being positioned above said frame of said trailer, said fire pit being comprised of a fire resistant material wherein said fire pit is configured to contain an open flame, said fire pit having a perimeter edge, said perimeter edge having a plurality of intersecting sides such that said fire pit has an octagonal shape, said fire pit being centrally positioned on said trailer;

a tube being coupled to and extending upwardly from said fire pit wherein said tube is configured to insertably receive an umbrella pole, said tube being centrally positioned in said fire pit;

a plurality of cooking grills, each of said cooking grills being coupled to and being positioned above said frame of said trailer, said plurality of cooking grills being distributed around said fire pit, each of said cooking grills having a bottom side, a front side, a back side, a first lateral side and a second lateral side, each of said first and second lateral sides of each of said cooking grills tapering inwardly between said front and back sides of said cooking grills such that each of said cooking grills has a trapezoidal shape, said back side of each of said cooking grills abutting a respective one of said intersecting sides of said perimeter edge of said fire pit having said cooking grills being distributed around said fire pit such that said front side of each of said cooking grills defines an octagonal shape, said front side of each of said cooking grills having an air opening extending therethrough for passing air therethrough;

a plurality of lids, each of said lids being hingedly coupled to a respective one of said cooking grills, each of said lids having a bottom edge, said bottom edge being coextensive with said front, back, first lateral and second lateral sides of said respective cooking grill, each of said lids being positionable between an open position and a closed position;

a plurality of handles, each of said handles being coupled to a respective one of said lids for gripping and thusly manipulating said respective lid, each of said handles being aligned with said front side of said cooking grill upon which said respective lid is positioned;

a table being coupled to and extending outwardly from said plurality of cooking grills, said table having a rear edge and a forward edge, said rear edge being coupled to said front side of each of said cooking grills such that said table extends fully around said octagonal shape defined by said plurality of cooking grills, said table being aligned with an intersection between said cooking grills and said lids having said table lying on a plane being horizontally oriented;

a plurality of chair units, each of said chair units being slidably coupled to said trailer, each of said chair units being slidable into a deployed position having said chair units extending outwardly beyond said table wherein each of said chair units is configured to have a user sit thereon, each of said chair units being slidable into a stored position having each of said chair units being positioned beneath said table, each of said chair units comprising:

a sleeve having a first end and a second end, said sleeve being coupled to said trailer having said sleeve being positioned between said table and said frame of said trailer, said first end of said sleeve of each of said chair units being coupled to a hub being centrally positioned beneath said fire pit having said sleeve of each of said chair units radiating outwardly from said hub, said second end of said sleeve being aligned with said forward edge of said table;

a member being slidably positioned in said sleeve, said member having a distal end with respect to said second end of said sleeve, said distal end being spaced outwardly from said forward edge of said table when said member is urged into a deployed position from said sleeve, said distal end of said member being aligned with said forward edge of said table when said member is positioned in a stored position in said sleeve;

a stool having a bottom surface and a top surface, said bottom surface being coupled to said member having said top surface lying on a plane being horizontally oriented and having said stool being aligned with said distal end of said member wherein said stool is configured to have a user seated thereon when said member is positioned in said deployed position; and a pair of legs, each of said legs having an upper end and a lower end, said upper end of each of said legs being pivotally coupled to said bottom surface of said stool, each of said legs being positionable in a stored position having said legs extending toward said hub to which said sleeve is attached, each of said legs being positionable in a deployed position having each of said legs extending downwardly from said stool wherein said lower end of said legs is configured to abut the support surface for support weight of the user;

a venting unit being coupled to said trailer, said venting unit being in fluid communication with each of said cooking grills thereby facilitating said venting unit to draw smoke from combustion in said cooking grills inwardly into said venting unit, said venting unit urging the smoke from said cooking grills outwardly through an exhaust wherein said venting unit is configured to inhibit the user from being exposed to the smoke, said venting unit comprising:

a duct being coupled to said bottom side of each of said cooking grills, said duct being in fluid communication with an interior of each of said cooking grills for receiving the smoke from said cooking grills, said duct extending around said perimeter edge of said fire pit;

a conduit being coupled to said duct and extending toward said hitch on said trailer, said conduit being in fluid communication with said duct for receiving the smoke from said duct, said conduit having a distal end with respect to said duct defining said exhaust of said venting unit;

a fan being positioned within said conduit wherein said fan is configured to urge air outwardly through said exhaust when said fan is turned on thereby facilitating the smoke to be urged outwardly through said exhaust;

a switch being coupled to said trailer, said switch being electrically coupled to said fan for turning said fan on and off, said switch being electrically coupled to a power source; and a plurality of smoke filters, each of said smoke filters being positioned within said conduit, each of said smoke filters being comprised of an air permeable material wherein each of said smoke filters is configured to filter particles from the smoke;

a storage box being coupled to said trailer for storing objects, said storage box being positioned on top of said table, said storage box including a lid being hingedly coupled thereto for opening and closing said storage box;

a cooler being coupled to said trailer for storing food items, said cooler being comprised of a thermally insulating material wherein said cooler is configured to inhibit thermal communication between ambient air and the food items, said cooler being positioned between said storage box and said hitch;

a stanchion being coupled to and extending upwardly from said trailer, said stanchion being positioned between said cooler and said hitch; and a display being coupled to said stanchion such that said display is elevated above said fire pit and said cooking grills wherein said display is configured to be visible to the user when the user is seated on said one of said chair units, said display being electrically coupled to a power source.

\* \* \* \* \*